(12) United States Patent
Furuhashi et al.

(10) Patent No.: US 10,696,582 B2
(45) Date of Patent: Jun. 30, 2020

(54) VEHICLE WINDOW GLASS AND METHOD FOR MANUFACTURING VEHICLE WINDOW GLASS

(71) Applicant: Central Glass Co., Ltd., Ube, Yamaguchi (JP)

(72) Inventors: Kazunori Furuhashi, Matsusaka (JP); Takao Niitsu, Matsusaka (JP)

(73) Assignee: CENTRAL GLASS CO., LTD., Yamaguchi (JP)

( * ) Notice: Subject to any disclaimer, the term of this patent is extended or adjusted under 35 U.S.C. 154(b) by 48 days.

(21) Appl. No.: 16/062,506

(22) PCT Filed: Nov. 14, 2016

(86) PCT No.: PCT/JP2016/083669
§ 371 (c)(1),
(2) Date: Jun. 15, 2018

(87) PCT Pub. No.: WO2017/126202
PCT Pub. Date: Jul. 27, 2017

(65) Prior Publication Data
US 2019/0002338 A1  Jan. 3, 2019

(30) Foreign Application Priority Data
Jan. 22, 2016 (JP) .................. 2016-010348

(51) Int. Cl.
*B32B 3/02* (2006.01)
*C03C 17/00* (2006.01)
(Continued)

(52) U.S. Cl.
CPC .............. *C03C 17/007* (2013.01); *B60J 1/00* (2013.01); *B60S 1/02* (2013.01); *B60S 1/58* (2013.01);
(Continued)

(58) Field of Classification Search
CPC ............ C03C 17/04; C03C 17/06; H05B 3/86
See application file for complete search history.

(56) References Cited

U.S. PATENT DOCUMENTS 5,817,586 A * 10/1998 Harada .................... C03C 8/04
501/17
7,223,940 B2 * 5/2007 Voeltzel ............ B32B 17/10036
219/203
(Continued)

FOREIGN PATENT DOCUMENTS

DE  202014010271  3/2015
EP  2664503  11/2013
(Continued)

OTHER PUBLICATIONS

Office Action issued in the JP Patent Application No. 2016-010348 dated Jul. 2, 2019.
(Continued)

*Primary Examiner* — Elizabeth E Mulvaney
(74) *Attorney, Agent, or Firm* — Bass, Berry & Sims, PLC

(57) ABSTRACT

To provide a vehicle window glass which is not susceptible to cracks, and a method for manufacturing the vehicle window glass.
A vehicle window glass 1 of the present invention is provided with: a glass plate 11; a color ceramic layer 12, which is formed on the surface of the glass plate 11, and has a thickness more than 10 μm but equal to or less than 25 μm; and an electrically conductive layer 13, which is formed on the surface of the color ceramic layer 12, and has silver as a main component. The electrically conductive layer 13 and a terminal electrically connected to the electrically conductive layer 13 are connected to each other using a lead-free solder 14. In the vehicle window glass 1 of the present (Continued)

invention, since the thickness of the color ceramic layer 12 is more than 10 μm, the glass plate 1 is not susceptible to cracks.

4 Claims, 2 Drawing Sheets

(51) Int. Cl.
  *C03C 17/04* (2006.01)
  *C03C 17/06* (2006.01)
  *B60S 1/02* (2006.01)
  *B60S 1/58* (2006.01)
  *B60J 1/00* (2006.01)
  *H05B 3/84* (2006.01)
  *H05B 3/86* (2006.01)

(52) U.S. Cl.
  CPC .............. *C03C 17/04* (2013.01); *C03C 17/06* (2013.01); *H05B 3/84* (2013.01); *H05B 3/86* (2013.01); *C03C 2217/452* (2013.01); *C03C 2217/479* (2013.01); *H05B 2203/013* (2013.01); *H05B 2203/016* (2013.01)

(56) References Cited

U.S. PATENT DOCUMENTS

| | | |
|---|---|---|
| 2013/0336837 A1 | 12/2013 | Nishi et al. |
| 2014/0008347 A1 | 1/2014 | Sagawa et al. |
| 2015/0296569 A1 | 10/2015 | Rateiczak et al. |
| 2016/0270159 A1 | 9/2016 | Rateiczak et al. |
| 2017/0033481 A1 | 2/2017 | Schmalbuch et al. |

FOREIGN PATENT DOCUMENTS

| | | |
|---|---|---|
| JP | 2012-091216 A | 5/2012 |
| JP | 2012-192449 | 10/2012 |
| JP | 2014-096198 | 5/2014 |
| WO | 2009026275 | 2/2009 |
| WO | WO 2012/090353 | 7/2012 |
| WO | WO 2012/096373 | 7/2012 |
| WO | WO 2012/118203 | 9/2012 |
| WO | 2015165632 | 11/2015 |

OTHER PUBLICATIONS

Supplemental European Search Report issued in the EP Patent Application No. 16886441.1, dated Nov. 12, 2018.
Office Action issued in the EP Patent Application No. 16886441.1 dated Nov. 23, 2018.

\* cited by examiner

VEHICLE WINDOW GLASS AND METHOD FOR MANUFACTURING VEHICLE WINDOW GLASS

CROSS-REFERENCE TO RELATED APPLICATIONS

This application is a U.S. 371 National Phase Application of International Application No. PCT/JP2016/083669, internationally filed on Nov. 14, 2016, claiming priority to Japan Application No. 2016-010348, filed on Jan. 22, 2016, the entire contents of which are hereby incorporated by reference.

TECHNICAL FIELD

The present invention relates to a vehicle window glass and a method for manufacturing a vehicle window glass.

BACKGROUND ART

In regard to vehicle window glasses, for the solder (solder alloy) that connects between a power supply terminal and a wiring formed from a silver paste on a glass plate serving as a base, solder containing lead has been conventionally used. However, in recent years, the influence of lead on the environment and the like have been raised as a matter, and thus transition to the use of lead-free solder is underway (see Patent Document 1).

Lead-free solder has higher Young's modulus and high rigidity compared to leaded solder containing lead. Therefore, when a mechanical stress or a stress caused by the difference in the thermal expansion coefficient is applied, there is a possibility that cracks and the like may be generated in the glass plate, or the solder may be peeled off.

Patent Document 1: PCT International Publication No. WO2012/096373

DISCLOSURE OF THE INVENTION

Problems to be Solved by the Invention

An object of the present invention is to provide a vehicle window glass that does not easily have cracks generated therein, and a method for manufacturing a vehicle window glass.

Means for Solving the Problems

The present invention solves the above-described problems by the following solutions.

The invention described in claim 1 is a vehicle window glass including a glass plate; a color ceramic layer formed on the surface of the glass plate and having a layer thickness of more than 10 μm and less than or equal to 25 μm; and an electrically conductive layer formed on the surface of the color ceramic layer and containing silver as a main component, in which the electrically conductive layer and a terminal that passes electricity to the electrically conductive layer are connected by lead-free solder.

The invention described in claim 2 is the vehicle window glass according to claim 1, in which the thickness of the color ceramic layer is 16 μm or more.

The invention described in claim 3 is the vehicle window glass according to claim 1 or 2, in which the electrically conductive layer is formed by applying on one sheet of screen.

The invention described in claim 4 is the vehicle window glass according to any one of claims 1 to 3, in which the electrically conductive layer has a layer thickness of 7 to 8 μm.

The invention described in claim 5 is a method for manufacturing the vehicle window glass according to any one of claims 1 to 4, the method including a step of printing a ceramic paste on the glass plate using a screen having a numerical aperture of larger than 38% and smaller than 60% and thereby forming a coating film of a precursor of the color ceramic layer; and a step of printing a silver paste on the coating film of a precursor of the color ceramic layer using one sheet of screen.

The invention described in claim 6 is the method for manufacturing a vehicle window glass according to claim 5, in which the number of times of the printing of the ceramic paste is a single time.

The configuration described above may be improved as appropriate, or at least a portion of the configuration may be substituted with other configurations.

Effects of the Invention

According to the present invention, a vehicle window glass that does not easily have cracks generated therein, and a method for manufacturing a vehicle window glass.

PREFERRED MODE FOR CARRYING OUT THE INVENTION

Figure 1:
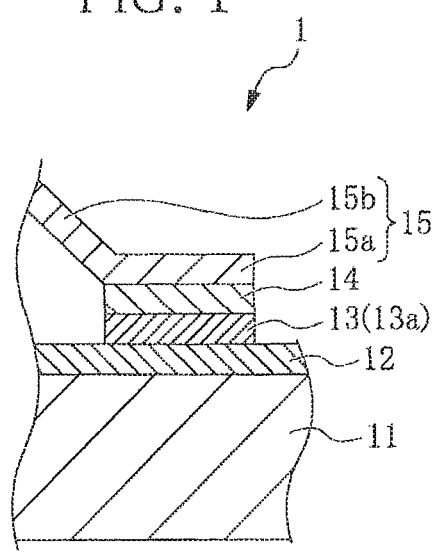
FIG. 1 is a cross-sectional view of the vehicle window glass of an embodiment of the present invention.
Figure 2:
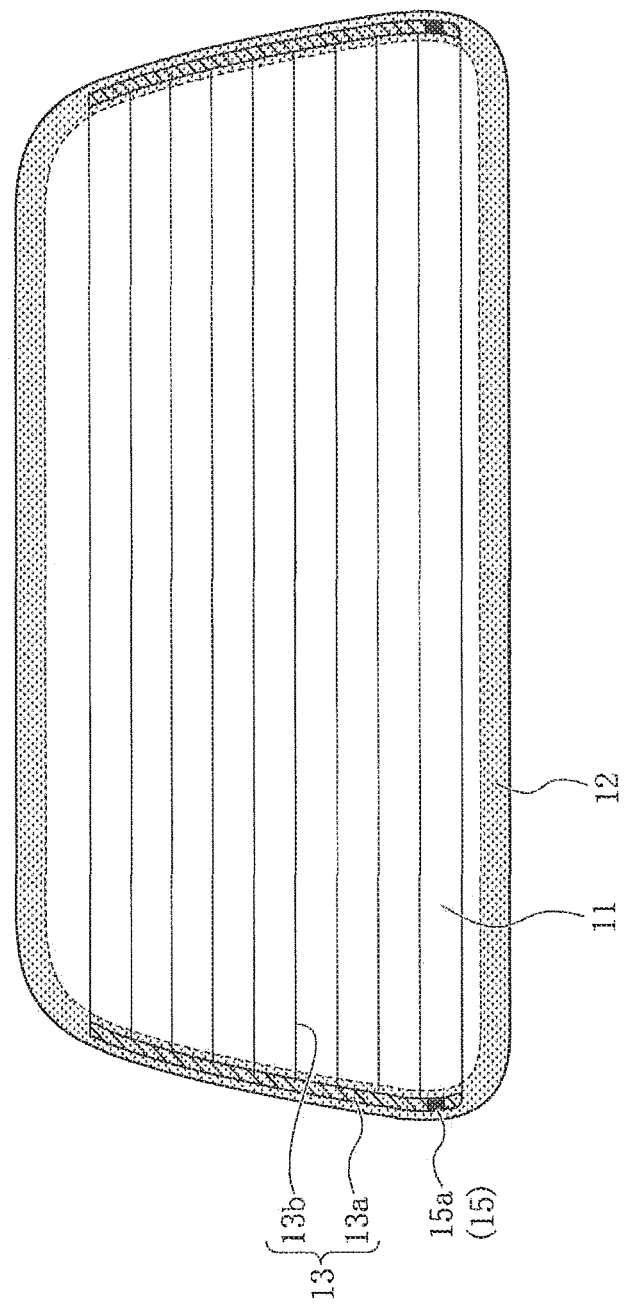
FIG. 2 is a plan view of a vehicle window glass 1 of the embodiments.

FIG. 1 is a cross-sectional view of vehicle window glass 1 of an embodiment of the present invention. FIG. 2 is a plan view of the vehicle window glass 1 of the embodiments.

The vehicle window glass 1 of the present embodiment is used as, for example, a rear window; however, the use of the window glass is not limited to this. When the vehicle window glass 1 illustrated in FIG. 1 is incorporated into a vehicle, the lower side of FIG. 1 comes to the outer side of the vehicle, and the upper side comes to the inner side of the vehicle.

As illustrated in FIG. 1, the vehicle window glass 1 includes a glass plate 11; a color ceramic layer (sintered ceramic layer) 12; an electrically conductive layer 13; a lead-free solder 14; and a power supply terminal 15.

(Glass Plate 11)

It is preferable that the glass plate 11 has a curved shape acquired by bending processing. For example, when the glass plate 11 is used as a rear window glass, the glass plate may be produced to have an approximately trapezoidal curved shape.

The glass plate 11 may also be a tempered glass plate having a compressive stress layer (external pressure application force) formed on the surface by thermally tempering by air jets or a chemically tempering method, or a laminated glass plate obtained by bonding two sheets of glass plates using a resin film.

Regarding the material for the glass plate 11, the soda lime silicate glass defined in ISO 16293-1 as well as materials having known glass compositions can be used. Furthermore, as the material for the glass plate 11, a material in which coloring components such as iron and cobalt are appropriately adjusted as components of the glass composition so that the glass plate exhibits color tones such as grey, green, and blue, may also be used.

(Color Ceramic Layer 12)

The color ceramic layer 12 is formed for the purpose of preventing deterioration of a urethane-based adhesive caused by solar radiation from the outside when the vehicle window glass 1 is adhered to the window frame, and hiding the wiring or the like of the electrically conductive layer 13 formed on the vehicle interior side surface of the vehicle window glass 1 from being seen from the outside. Preferably, a black-colored color ceramic layer is used.

The color ceramic layer 12 is a color ceramic composition including a heat-resistant pigment (metal oxide) as an inorganic component, and a glass material having a softening point lower than the softening point of the glass plate 11.

As the composition, a composition formed by applying a ceramic paste formed by kneading a powder of a heat-resistant pigment (metal oxide) as an inorganic component and a powder of glass frit as a glass material together with a vehicle, on the surface of the glass plate 11 by screen printing, and calcining the applied ceramic paste, can be used.

A heat-resistant pigment is incorporated in order to impart an intended color to the ceramic color. The particle size of the pigment is determined as appropriate in consideration the dispersibility in the ceramic paste or color developability, and a heat-resistant pigment having a 50% particle size of 0.1 to 10 μm, and preferably about 0.2 to 5 μm, can be used.

Regarding the heat-resistant pigment, a conventionally used heat-resistant pigment can be used. Examples of a pigment for displaying black color include a copper-chromium composite oxide, an iron-manganese composite oxide, a copper-chromium-manganese composite oxide, a cobalt-iron-chromium composite oxide, and magnetite. Examples of a pigment for displaying brown color include a zinc-iron composite oxide and a zinc-iron-chromium composite oxide.

Furthermore, examples of a blue-colored pigment include cobalt blue, and examples of a green-colored pigment include chrome green, a cobalt-zinc-nickel-titanium composite oxide, and a cobalt-aluminum-chromium composite oxide.

In addition to these pigments, white-colored pigments (titanium white, zinc oxide, and the like), red-colored pigments (red iron oxide, and the like), and yellow-colored pigments (titanium yellow, a titanium-barium-nickel composite oxide, a titanium-antimony-nickel composite oxide, a titanium-antimony-chromium composite oxide, and the like) can also be used.

The glass frit is intended for forming the color ceramic layer 12 by binding the color ceramic to the glass plate. Regarding the glass frit, any glass frit that is conventionally used for color ceramics can be used. Examples of such glass frit include borosilicate-based glass, zinc borosilicate-based glass, and bismuth-based glass. These glass frits can be used singly or in combination of two or more kinds thereof.

The softening point temperature of the glass frit is preferably lower than the bending processing temperature of the glass plate 11, for example, 600° C. to 750° C., and a glass frit having a softening point temperature of about 380° C. to 600° C., preferably 400° C. to 580° C., and more preferably 410° C. to 550° C., can also be used.

The particle size of the glass frit is determined as appropriate in consideration of the coatability of the ceramic paste at the time of screen printing, and for example, a glass frit having a 50% particle size of about 0.1 to 10 μm, preferably 0.5 to 5 μm, and more preferably 1 to 4 μm, can be used.

In regard to the color ceramic layer 12, the content of the glass material (sintered glass frit) can be adjusted to 50% to 95% by mass, and preferably 60% to 80% by mass. This content can be appropriately adjusted in consideration of the binding property of the color ceramic layer 12 to the glass plate 11 and the color tone of the color ceramic layer 12.

The reason why the stress exerted on the glass plate 11 by the lead-free solder 14 can be relieved by interposing a color ceramic layer 12 having a predetermined thickness therebetween, is not clearly understood. The color ceramic layer 12 is a calcination product of the glass material and the heat-resistant pigment, and the color ceramic layer 12 becomes a porous body containing pores. It is speculated that since the color ceramic layer 12 becomes a material that is more flexible than the glass 11, stress relief occurs in the color ceramic layer 12 having a predetermined thickness.

The vehicle is a material incorporated in order to produce a powder of a heat-resistant pigment (metal oxide) as an inorganic component and a powder of glass frit as a glass material into a paste, and to apply the paste to a coating process such as screen printing, and the vehicle includes a dispersing medium and a binder. The vehicle is incorporated in an appropriate amount in consideration of printability (coatability), and for example, the vehicle can be incorporated in an amount of 10% to 50% by mass, and preferably 15% to 45% by mass with respect to the total amount of the color ceramic paste.

The dispersing medium is preferably a medium which has low volatility at normal temperature and has a boiling point such that the dispersing medium volatilizes at a temperature lower than the temperature at which the glass frit is softened. For example, a dispersing medium having a boiling point of about 50° C. to 250° C. can be used.

Examples of the dispersing medium include aliphatic alcohols (for example, saturated or unsaturated C6-3 such as 2-ethyl-1-hexanol, octanol, and decanol, and the like, or aliphatic alcohols), cellosolves (C1-4 alkyl cellosolves such as methyl cellosolve, ethyl cellosolve, and butyl cellosolve, and the like), cellosolve acetates (C1-4 alkyl cellosolve acetates such as ethyl cellosolve acetate and butyl cellosolve acetate), carbitols (C1-4 alkyl carbitols such as methyl carbitol, ethyl carbitol, propyl carbitol, and butyl carbitol, and the like), carbitol acetates (C1-4 alkyl cellosolve acetates such as ethyl carbitol acetate and butyl carbitol acetate), aliphatic polyhydric alcohols (for example, ethylene glycol, diethylene glycol, dipropylene glycol, 1,4-butanediol, triethylene glycol, and glycerin), alicyclic alcohols such as [for example, cycloalkanols such as cyclohexanol; and terpene alcohols (for example, monoterpene alcohol) such as 1-terpineol and dihydroterpineol], aromatic carboxylic acid esters (phthalic acid di-C1-10 alkyl esters such as dibutyl phthalate and dioctyl phthalate; phthalic acid di-C1-10 alkyl aralkyl esters such as dibutyl benzyl phthalate; and the like), and mixtures thereof.

Regarding the binder, any binder capable of imparting adequate viscosity to the color ceramic paste and capable of being decomposed at about 200° C. to 550° C., and preferably 220° C. to 400° C., may be used.

Examples thereof include a thermoplastic resin (an olefin-based resin, a vinyl-based resin, an acrylic resin, a styrene-based resin, a polyester-based resin, a polyamide-based resin, a cellulose derivative, and the like), a thermosetting resin (a thermosetting acrylic resin, an epoxy resin, a phenolic resin, an unsaturated polyester-based resin, a polyurethane-based resin, and the like), and mixtures thereof. An acrylic resin is preferred. The proportion of the vehicle with respect to the total amount may be 5% to 80% by mass, preferably 10% to 50% by mass, and more preferably 15% to 40% by mass.

(Electrically Conductive Layer 13)

The electrically conductive layer 13 has, as illustrated in FIG. 2, busbars 13a respectively formed on the color ceramic layer 12 on both lateral edges of the glass plate 11; and wire filaments 13b arranged in parallel at a predetermined distance and connecting the both busbars 13a.

The electrically conductive layer 13 is a conductor composition including silver metal (silver or a silver alloy), and a glass material having a softening point temperature lower than the softening point temperature of the glass plate 11. The composition is formed such that a silver paste containing silver as a main component is applied on the color ceramic layer 12 by screen printing along a predetermined pattern, and the applied material is sintered. The electrically conductive layer 13 is, for example, a hot wire print of a defogger or a defroster; however, the electrically conductive layer may also be an antenna print for broadcast reception.

The color ceramic layer 12 and the electrically conductive layer 13 are sintered together after being screen printed and dried, as described above.

The silver paste includes a silver powder containing silver or a silver alloy; glass frit that becomes a glass material in the conductor composition; a vehicle; and other additives as necessary.

The content of the silver metal in the conductor composition, and the particle size of the silver powder in the silver paste are determined as appropriate in consideration of the specific resistance of the electrically conductive layer 13. The content of silver metal in the conductor composition can be adjusted to, for example, 85% to 99% by mass, and preferably 88% to 98% by mass.

The other component is substantially formed from a glass material having a softening point lower than the softening point of the glass plate 11, and this glass component can be formed by calcining glass frit. Regarding the particle size of the silver powder, a silver powder having a 50% particle size of about 0.1 to 10 μm, and preferably 0.2 to 7 μm, can be used.

Regarding the glass frit and the vehicle used in the silver paste, those similar to the glass frit and vehicle mentioned in the section for the color ceramic paste can be applied, and regarding the mixing proportion of the vehicle, the vehicle can be incorporated at a proportion of 10% to 50% by mass, and preferably 15% to 45% by mass, with respect to the total amount of the paste.

In regard to the conductor composition, since it is necessary to secure electrical conductivity of the composition, the percentage content of silver metal needs to be increased, and the conductor composition has a lower percentage content of the glass material compared to the color ceramic layer. The object of the present invention may be potentially achievable by producing the electrically conductive layer 13 into a thick film; however, in order to produce the electrically conductive layer 13 into a thick film, it is necessary to apply an ample amount of the silver paste on the glass plate 11. Application of the silver paste on the glass plate 11 can be carried out by screen printing; however, for the purpose of increasing the production efficiency, it is preferable that the number of times of printing is set to one time. Therefore, the discharge amount of the silver paste onto the glass plate may be increased by stacking at least two sheets of the screen. When application is achieved according to this method, production of the electrically conductive layer 13 into a thick film accelerates surface roughening of the electrically conductive layer surface.

Surface roughening of the surface of the electrically conductive layer 13 allows firm, joining of the lead-free solder 14 to the electrically conductive layer by the anchor effect. Then, the stress exerted by the lead-free solder 14 to the glass plate 11 becomes larger. When the production efficiency is considered, and production of the color ceramic layer 12 into a thick film is attempted, consequently, cracks are easily produced in the glass plate 11 in the vehicle window glass 1. When this is considered, it is preferable that the thickness of the electrically conductive layer 13 is adjusted to 7 to 8 μm. With this thickness, the electrically conductive layer 13 can be formed highly efficiently without causing surface roughening of the electrically conductive layer 13.

(Lead-Free Solder 14)

The lead-free solder 14 joins a defogger hot wire or an antenna wire formed in the electrically conductive layer 13, with a power supply terminal 15.

The lead-free solder 14 may be, for example, a Sn—Ag-based lead-free solder or a Sn—Ag—Cu-based lead-free solder, and the examples are not limited to these. However, in order to suppress silver solder erosion of the silver wire caused by lead-free solder 14, that is, in order to prevent silver in the electrically conductive layer 13 from diffusing into the lead-free solder 14 and to prevent the percentage content of silver in the electrically conductive layer 14 from decreasing, it is preferable that the lead-free solder 14 contains Ag.

Among lead-free solders, a lead-free solder containing Sn at a content of 95% by mass or more is used, and the content is adjusted to preferably 95% to 99% by mass, and more preferably 96% to 98% by mass. The content of Ag is adjusted to 5% by mass or less, preferably 1.5% to 5% by mass, and more preferably 2% to 4% by mass. When the lead-free solder contains Cu, the content of Cu can be adjusted to 1.5% by mass or less, and preferably 1% to 0.1% by mass.

(Power Supply Terminal 15)

The power supply terminal 15 is connected to a power supply mounted in the automotive vehicle (not shown in the diagram) and is provided in order to supply an electric current to the electrically conductive layer 13. Regarding the material for the terminal 15, an electrically conductive material is satisfactory, and a material that can be easily processed by mechanical processing is preferred. For example, copper and brass can be used.

A structural example of the power supply terminal 15 may be a terminal having a pair of terminal washers 15a that are joined by the lead-free solder 14; a leg 15b that connects these washers; and a site for connecting to an electric cable (not shown in the diagram).

In this manner, a vehicle window glass 1 in which a glass plate 11, a color ceramic layer 12, an electrically conductive layer 13, a lead-free solder 14, and a power supply terminal 15 are laminated, is produced.

(Crack Generation)

Here, in the defogger wiring or antenna wiring formed by the electrically conductive layer 13, an electric current is caused to flow through or is cut off via the power supply terminal 15. Thereby, the glass plate 11 is repeatedly heated and cooled. Furthermore, heating and cooling is repeated by the influence of the atmospheric environment.

Since the lead-free solder 14 has high elastic modulus and high rigidity compared to conventional leaded solders, it is difficult for the lead-free solder to conform flexibly to the expansion and contraction of the glass plate 11. Therefore, when the thermal expansion coefficient of the lead-free solder is different from the thermal expansion coefficient of the glass plate 11, stress is applied to the glass plate 11, and cracks (fissures, breakage, cracking or the like) are likely to be generated.

As explained above, the inventors of the present invention found that even when the lead-free solder 14 is used, in a case in which the layer thicknesses of the color ceramic layer 12 and the electrically conductive layer 13 and the like satisfy predetermined conditions, the glass plate 11 does not easily undergo cracking even if heating and cooling of the glass plate 11 is repeated. In the following description, the experimental results will be explained.

(Content of Experiment)

1. Formation of Color Ceramic Layer 12 and Electrically Conductive Layer 13 on Glass Plate 11

A color (black) ceramic paste was applied by screen printing on the peripheral edge of a glass plate 11 (flat glass plate measuring 300 mm on each side (thickness 3.5 mm)), and the ceramic paste was dried for 20 minutes at 120° C. Thus, a precursor coating film of the color ceramic layer 13 was formed into a frame form on the peripheral edge of the glass plate 11.

Subsequently, a silver paste was applied on the coating film of the precursor of the color ceramic layer 12 and on the glass plate 11 by screen printing, and the silver paste was dried for 10 minutes at 120° C. Thus, a precursor coating film of the electrically conductive layer 13 was formed.

The glass plate 11 having various precursor coating films formed thereon was subjected to bending processing and thermal tempering by air jets in a known air-jet tempering furnace, and thus a glass plate 11 having a color ceramic layer 12 and an electrically conductive layer 13 formed thereon was obtained.

The electrically conductive layer 13 connects busbars 13a, which are formed on the color ceramic layer 12 on both lateral edges of the glass plate 11 and have a width of 18 mm and a length of 250 mm; and wire filaments 13b having a wire width of 0.5 m, which connect the both busbars 13a and are arranged in parallel at a distance of 40 mm.

The thickness of the color ceramic layer 12, the thickness of the electrically conductive layer 13, the surface roughness (Ra) of the electrically conductive layer, and the conditions for screen printing of various Examples and Comparative Examples are as shown in Table 1.

2. Joining of Power Supply Terminal 15 to Electrically Conductive Layer 13 (Busbar 13a) Through Lead-Free Solder 14

The lead-free solder 14, in which Sn (98% by mass)—Ag (2% by mass) is contained in an amount of 0.3 to 0.6 g, is heated to be adhered to the terminal washer 15a of the power supply terminal 15.

Subsequently, a flux was applied on the lead-free solder 14, the lead-free solder 14 on the electrically conductive layer 13 (busbar 13a) was locally heated, and thereby joining of the power supply terminal 15 to the electrically conductive layer 13 (busbar 13a) through the lead-free solder 14 was performed.

In the present Example, a flat glass plate was used as an experiment for examining the influence of the lead-free solder 14 on the glass plate 11; however, it is needless to say that similar results can also be obtained even with a three-dimensionally bending-processed glass plate, which is used as a vehicle glass.

3. Quality Evaluation of Joining Part by Lead-Free Solder 14

The quality of the joining part was evaluated by subjecting the vehicle window glass 1 to a cooling-heating cycle resistance test. Specifically, a treatment of 20° C.→−40° C. (90 minutes)→20° C.→105° C. (120 minutes)→20° C. was designated as one cycle, and an observation was made on the presence or absence of crack generation in the glass plate 11 after repeatedly performing 60 cycles.

Furthermore, the power supply terminal 15 was pulled with a force of 80 N using a push-pull gauge, in a direction perpendicular to the joined surface between the electrically conductive layer 13 and the terminal washer 15a, and thereby the bonding strength of the joined body was measured. A sample in which there was no crack generation in the glass plate 11 and detachment did not occur at the joining part, was determined as a satisfactory product.

The test results are shown below.

TABLE 1

| Layer thickness of color ceramic layer, μm | Type of mesh and number of times of screen printing for color ceramic layer | Layer thickness of electrically conductive layer, μm | Type of mesh and number of times of screen printing for electrically conductive layer | Presence or absence of cracks in glass plate |
|---|---|---|---|---|
| 20 | #180 was used twice | 7~8 (Ra: 1.0 μm) (Rz: 6.4 μm) | #200 was used once | Absent |
| 20 | #180 was used twice | 10 (Ra: 1.1 μm) (Rz: 7.3 μm) | #200 + #135, Two kinds of screens were overlapped, and silver paste was applied. | Absent |
| 20 | #180 was used twice | 13 (Ra: 1.3 μm) (Rz: 8.3 μm) | #200 + #110, Two kinds of screens were overlapped, and silver paste was applied. | Absent |
| 18 | #110 was used once | 7~8 | #200 was used once | Absent |
| 18 | #110 was used once | 10~12 | #200 + #135, Two kinds of screens were overlapped, and silver paste was applied. | Present |

TABLE 1-continued

| Layer thickness of color ceramic layer, μm | Type of mesh and number of times of screen printing for color ceramic layer | Layer thickness of electrically conductive layer, μm | Type of mesh and number of times of screen printing for electrically conductive layer | Presence or absence of cracks in glass plate |
|---|---|---|---|---|
| 18 | #110 was used once | 16~17 | #200 + #110, Two kinds of screens were overlapped, and silver paste was applied. | Present |
| 10 | #180 was used once | 7~8 | #200 was used once | Present |
| 10 | #180 was used once | 10~12 | #200 + #135, Two kinds of screens were overlapped, and silver paste was applied. | Present |
| 10 | #180 was used once | 16~17 | #200 + #110, Two kinds of screens were overlapped, and silver paste was applied. | Present |

For the screen, smart meshes produced by Nippon Tokushu Fabric, Inc. were used. The types of meshes, namely, #110, #135, #180, and #200, are screen mesh standards, and the numbers each represent the number of lines in a square measuring 1 inch (25.4 mm) on each of four sides. For the screens thus used, the line width, mesh opening (distance between lines), and numerical aperture of the screens were as follows.

TABLE 2

| Lines in 1-inch square | Line width of screen | Mesh opening | Numerical aperture |
|---|---|---|---|
| #110 | 71 μm | 160 μm | 48% |
| #135 | 54 μm | 134 μm | 51% |
| #180 | 54 μm | 87 μm | 38% |
| #200 | 54 μm | 73 μm | 32% |

In a case in which the line widths of screens are the same, as the number of lines that constitute the mesh is larger, the screen becomes compact, and the amount of discharging the paste onto the glass tends to decrease.

Meanwhile, it can be seen that in order to form the color ceramic layer 12, it is preferable that the number of times of printing is adjusted to one time, and a screen having a mesh opening size of 140 to 180 μm (preferably 150 to 170 μm) and a numerical aperture of 40% to 60% (preferably 45% to 55%) is used. Furthermore, in order to form the electrically conductive layer 13, it is preferable that the number of times of printing is adjusted to one time, and a screen having a mesh opening of 53 to 93 μm (preferably 63 to 83 μm) and a numerical aperture of 24% to 39% (preferably 28% to 36%) is used.

(Consideration on Layer Thickness of Color Ceramic Layer 12)

As shown in the table, in a case in which the thickness of the color ceramic layer 12 was 10 μm (#180 was used once), cracks were generated in the glass plate 11, irrespective of the layer thickness of the electrically conductive layer 13.

In a case in which the thickness of the color ceramic layer 12 was 18 μm (#110 was used once), cracks were not generated in the glass plate 11 when the layer thickness of the electrically conductive layer 13 was 7 to 8 μm; however, when the layer thickness of the electrically conductive layer 13 was 10 μm or more, cracks were generated in the glass plate 11.

In a case in which the thickness of the color ceramic layer 12 was 20 μm (#180 was used twice), cracks were not generated in the glass plate 11, irrespective of the layer thickness of the electrically conductive layer 13.

It was found that in a case in which the color ceramic layer 12 was 10 μm (#180 was used once), cracks were generated irrespective of the thickness of the electrically conductive layer 13 or the number of times of screen printing.

Therefore, it is preferable that the thickness of the color ceramic layer 12 is larger than 10 μm. Furthermore, it is more preferable that the thickness is 18 μm or more.

Meanwhile, when the thickness of the color ceramic layer 12 is larger than 25 μm, there is a problem that the production efficiency is decreased.

Therefore, the thickness of the color ceramic layer 12 of the present embodiment is preferably more than 10 μm and less than or equal to 25 μm, and more preferably from 18 μm to 22 μm.

A case in which the thickness of the ceramic layer 12 becomes 10 μm occurs when #180 is used once. That is, when the numerical aperture is 38%. Therefore, it is preferable that the numerical aperture is higher than 38%.

A case in which the thickness of the ceramic layer 12 becomes 18 μm occurs when #110 is used once. That is, since the numerical aperture is 48%, it is more preferable that the numerical aperture is 48% or higher.

In addition, a case in which the thickness of the ceramic layer 12 becomes 25 μm occurs when the numerical aperture is 60% or higher.

(Consideration on Electrically Conductive Layer 13)

As explained above, in a case in which the thickness of the color ceramic layer 12 was 10 μm, cracks were generated in the glass plate 11, irrespective of the layer thickness of the electrically conductive layer 13.

In a case in which the thickness of the color ceramic layer 12 was 18 μm, cracks were not generated in the glass plate 11 when the layer thickness of the electrically conductive layer 13 was 7 to 8 μm; however, when the layer thickness of the electrically conductive layer 13 was 10 μm or more, cracks were generated in the glass plate 11.

In a case in which the thickness of the color ceramic layer 12 was 20 µm, cracks were not generated in the glass plate 11 irrespective of the layer thickness of the electrically conductive layer 13.

This is speculated that in a case in which the thickness of the color ceramic layer 12 is 10 µm and 20 µm, since the influence of the thickness of the color ceramic layer 12 is strong, the presence or absence of cracks in the glass plate 11 is determined irrespective of the thickness of the electrically conductive layer 13.

That is, in a case in which the thickness of the color ceramic layer 12 is 10 µm, since the color ceramic layer 12 is thin, the stress occurring due to the difference in the thermal expansion between the lead-free solder 14 and the glass plate 11 cannot be buffered, and cracks are generated in the glass plate 11.

In a case in which the thickness of the color ceramic layer 12 is 20 µm, since the color ceramic layer 12 is thick, the stress occurring due to the difference in the thermal expansion between the lead-free solder 14 and the glass plate 11 is buffered, and cracks are not generated in the glass plate 11.

Meanwhile, in a case in which the thickness of the color ceramic layer 12 is 18 µm, it may be considered that the influence exerted by the thickness of the color ceramic layer 12 on the presence or absence of cracks in the glass is fluid.

Therefore, the state of the electrically conductive layer 13 also affects the presence or absence of cracks in the glass. Thus, it may be considered that in a case in which the electrically conductive layer 13 has a thickness of 7 to 8 µm as a result of performing screen printing once, cracks are not generated in the glass plate 11, and in a case in which the electrically conductive layer has a thickness of 10 µm or more as a result of performing screen printing twice, cracks are generated in the glass plate 11.

It is speculated that this is affected by the number of sheets of screens stacked when the electrically conductive layer 13 is formed.

The electrically conductive layer 13 is such that when the electrically conductive layer 13 is formed by performing coating with two sheets of screens, the surface of the electrically conductive layer 13 becomes rough compared to a case in which the electrically conductive layer 13 is formed by performing coating with one sheet of screen. As the surface becomes rougher, the adhesion between the electrically conductive layer 13 and the lead-free solder 14 becomes strong due to the anchor effect. If the adhesive force becomes too strong, a large amount of stress is exerted on the glass plate 11 due to the difference between the expansion coefficient of the glass plate 11 and the thermal expansion coefficient of the lead-free solder 14, and cracks are likely to be generated.

On the other hand, when the electrically conductive layer 13 is formed by performing coating with one sheet of screen, the surface of the electrically conductive layer 13 is smooth compared to a case in which the electrically conductive layer 13 is formed by performing coating with two sheets of screens. Therefore, in a case in which the electrically conductive layer is formed by performing coating with one sheet of screen, the adhesive force between the electrically conductive layer 13 and the lead-free solder 14 is weak, compared to a case in which the electrically conductive layer 13 is formed by performing coating with two sheets of screens. Therefore, the stress occurring due to the difference between the expansion coefficient of the glass plate 11 and the thermal expansion coefficient of the lead-free solder 14 is relieved, and cracks are not easily generated in the glass plate 11. Meanwhile, even in this case, the electrically conductive layer 13 and the lead-free solder 14 did not undergo detachment.

That is, the adhesive force between the electrically conductive layer 13 and the lead-free solder 14 was not so weak to cause detachment; however, since the adhesive force was weak to the extent that the difference in the thermal expansion between the lead-free solder 14 and the glass plate 11 was barely buffered, it is considered that cracks were not generated in the glass plate 11.

Therefore, the electrically conductive layer 13 of the embodiment may be considered to have been formed by performing coating with one sheet of screen, in a case in which the thickness of the color ceramic layer 12 is 18 µm.

In order to form the electrically conductive layer 13, the mesh opening is preferably #200, that is, the numerical aperture is preferably 32%, so that the formation can be achieved with one sheet of screen.

Effects of Embodiments (1) The vehicle window glass 1 of the present embodiments includes a glass plate 11; a color ceramic layer 12 formed on the surface of the glass plate 11; and a electrically conductive layer 13 formed on the surface of the color ceramic layer 12 and containing silver as a main component, and the electrically conductive layer 13 is connected to a terminal 15 through which electricity is conducted to the electrically conductive layer 3, by means of a lead-free solder 14. The thickness of the color ceramic layer 12 is more than 10 µm and less than or equal to 25 µm.

According to the present embodiment, since the thickness of the color ceramic layer 12 is larger than 10 µm, cracks are not easily generated in the glass plate 1.

(2) When the thickness of the color ceramic layer 12 is 18 µm or larger, crack generation occurs with more difficulties. Furthermore, when the thickness of the color ceramic layer 12 is 20 µm or more, cracks are generated in the glass plate 1 with even more difficulties.

(3) Since the thickness of the color ceramic layer 12 of the vehicle window glass 1 of the embodiments is 18 µm, and the electrically conductive layer 13 is formed by performing coating with one sheet of screen, cracks are not easily generated in the glass plate 1.

(4) Since the electrically conductive layer 13 of the vehicle window glass 1 of the embodiments is such that when the thickness of the color ceramic layer 12 is 18 µm, the layer thickness of the electrically conductive layer is 7 to 8 µm, cracks are not easily generated in the glass plate 1.

EXPLANATION OF REFERENCE NUMERALS

1: Vehicle window glass, 11: glass plate, 12: color ceramic layer, 13: electrically conductive layer, 14: lead-free solder, 15: power supply terminal

The invention claimed is:

1. A vehicle window glass, comprising:
   a glass plate;
   a color ceramic layer formed on the surface of the glass plate and having a layer thickness of more than 10 µm and less than or equal to 25 µm;

an electrically conductive layer formed on the surface of the color ceramic layer, containing silver as a main component, and having a layer thickness of 7 μm to 8 μm;

a lead-free solder; and a terminal through which electricity is conducted to the electrically conductive layer;

wherein the glass plate, the color ceramic layer, the electrically conductive layer, the lead-free solder and the terminal are laminated in this order.

2. The vehicle window glass according to claim 1, wherein the thickness of the color ceramic layer is 18 μm or more.

3. The vehicle window glass according to claim 1, wherein the electrically conductive layer is formed by performing coating with one sheet of screen.

4. The vehicle window glass according to claim 1, wherein the lead-free solder is a Sn—Ag-based lead-free solder or a Sn—Ag—Cu-based lead-free solder.

* * * * *